United States Patent Office 2,760,875
Patented Aug. 28, 1956

2,760,875

CERAMIC COMPOSITION AND PROCESS FOR MAKING SAME

Karl Schwartzwalder, Holly, and Helen Blair Barlett, Flint, Mich., assignors to General Motors Corporation, Detroit, Mich., a corporation of Delaware No Drawing. Application October 31, 1951, Serial No. 254,194

6 Claims. (Cl. 106—46)

This invention relates to ceramic articles of manufacture such as spark plug insulators and to a method for their manufacture. More particularly it relates to ceramic articles of the alumina-silica type having improved resistance to heat shock and to the corrosive effects of lead salts.

One of the most suitable ceramics for use as a spark plug insulator composition is that type which consists of a glass bonded mass of corundum crystals. In such a composition the corundum crystals are enveloped by glass and are thereby bonded together into a dense sintered non-porous mass, the large proportion of corundum being the discontinuous phase and the relatively small proportion of glass being the continuous phase. The physical characteristics of such glass bonded alumina compositions are decidedly superior in many ways to other types of ceramics conventional used for spark plug insulators. They possess superior electrical insulating properties at high temperature, high mechanical strength, high thermal conductivity, high thermal expansion and other desirable qualities. In addition, the firing temperature required to produce a non-porous article is also lower than that necessary for alumina type ceramics not having a glass phase, which of course is a decided advantage in the production of spark plug insulators and other electrical insulating bodies.

The chief disadvantage of such compositions is their susceptibility to attack by lead salts. Since it is the usual practice to add lead compounds to automotive fuels in order to prevent "knocking" and in order to impart other desirable characteristics to the fuel, this susceptibility of the ceramic to attack by lead compounds is a decided disadvantage insofar as its use for spark plug insulators is concerned. The lead compounds may be bromides, chlorides or sulphates or reaction products of these compounds with other metals. These salts may be deposited during idling periods and melted during high engine output, at which time the molten salts attack the insulator.

Likewise, crucibles and lining materials which are made of a glass bonded corundum type ceramic suffer the same disadvantage and are therefore not particularly suitable if their use requires considerable contact with lead salts.

Microscopic examination has shown that the attack by lead compounds takes place in the glass phase of the physical structure of the insulator rather than on the crystalline phase. It appears that the lead compounds react with the glass phase of the ceramic and gradually erode it away, resulting in a decrease in shock resistance, mechanical strength, and in other desirable qualities. If the ceramic is used as an electrical insulator this susceptibility of the glass phase to lead salt corrosion is particularly disadvantageous since it results in a rapid decrease in electrical resistance. It is believed that the glass phase, after being subjected to lead salts, becomes conductive so that a short circuit is formed along the surface of the insulator.

It is an object of this invention to provide ceramic articles of the sintered glass bonded corundum type which have increased resistance to lead salt corrosion. Another object of the invention is a provision of a method whereby ceramic articles of the sintered glass bonded corundum type, having increased resistance to lead salt corrosion, may be manufactured.

We have found that the constituents comprising the glass phase can influence the degree of attack by the lead salts and, in accordance with this invention, the above objects are accomplished by the inclusion in the glass phase of the ceramic of strontium oxide either alone or in combination with other alkaline earth oxides, thereby rendering the ceramic articles very resistant to attack by lead compounds. We have found that the combination of strontium oxide and magnesium oxide in the glass phase is particularly advantageous since such a combination results not only in increased resistance to lead attack, but also in highly increased resistance to thermal shock.

The improved ceramic compositions of this invention are prepared from a batch consisting of alumina, some suitable silica containing compound such as Florida kaolin, together with strontium oxide or carbonates and in some instances some other alkaline earth compound.

The alumina is added as calcined alumina of the type known as tabular corundum which has been fired at an extremely high temperature or alumina calcined sufficiently to convert the gamma alumina to alpha alumina or as fused alumina. The type of alumina can be varied to give certain of the physical characteristics desired.

The silica is preferably added in a combined form such as raw clay, calcined clay (aluminum silicates such as Florida kaolin) or in those instances where the strontia is to be used in combination with other alkaline earths, as an alkaline earth silicate. Often, of course, the total silica content is derived from two or more different sources as, for example, some from Florida kaolin and some from talc (magnesium silicate).

While the strontia addition may be made in the form of strontium oxide itself we have found it preferable to add it in the form of strontium carbonate due to its lower solubility in water which is advantageous in processing. The carbonate is of course converted to the oxide during the early stages of the heat treatment.

The following example of the raw batch used for the manufacture of our preferred embodiment, that is, a ceramic of the type previously described and containing a combination of strontia and magnesia in the glass phase, will serve to illustrate:

| | Percent by weight |
|---|---|
| Tabular corundum ($Al_2O_3$) | 90 |
| Sierra talc ($3MgO.4SiO_2.H_2O$) | 5 |
| Florida kaolin ($Al_2O_3.2SiO_2.2H_2O$) | 4.5 |
| Strontium carbonate ($SrCO_3$) | .5 |

If it is desired to use strontia by itself as the addition agent, then the Sierra talc is of course omitted from the batch, or if it is desired to use strontia in combination with some other alkaline earth oxide such as calcia, then the Sierra talc is replaced by some suitable compound such as calcium carbonate. It is to be understood, of course, that the proportions of the various constituents of the raw batch can be changed in order to attain the exact characteristics or properties desired in the finished ceramic body. A raw batch, for example, consisting of 90% tabular corundum, 3% Florida kaolin, 4% Sierra talc and 3% strontium carbonate, will yield a final product having a higher strontia but a lower magnesia content than that which will result from the raw batch composition listed above.

The raw batch composition is thoroughly pulverized and mixed, after which it can be made into ceramic articles such as spark plug insulators by any one of a number of methods such as injection molding or isostatic molding. The composition can also be extruded and ground to shape.

In the method known as injection molding, an organic binder such as a thermosetting or thermoplastic resin is ground with the inorganic raw batch composition in a water-cooled ball mill to the desired degree of fineness. This material is admixed with a liquid plasticizer and then hot-mixed together to develop maximum flow qualities. The material is then pelletized and fed into an injection molding machine where it is injected into a pattern of cold dies. When the pattern is ejected the shapes are removed, dried to remove the plasticizer and then fired to a dense non-porous condition.

In the isostatic molding method the inorganic materials are ground to the desired state of subdivision, an emulsified wax and organic bonding agent added, and the liquid suspension spray-dried to yield a free-flowing agglomerated material. This material is then pressed to the approximate article shape by employing rubber molds. The resulting blank is ground to the required shape and then fired.

The composition may also be made into the required shapes by extruding the plastic mixture, drying and grinding to shape. The shapes are then fired to yield the final product having the desired physical properties.

In the above processes allowance must be made for the shrinkage in the article size which will result during the firing operation.

It is understood, of course, that any suitable shaping process will suffice and thus, while the above mentioned procedures are given for purposes of illustration, the invention is not intended to be limited thereby.

Since the firing temperature influences the physical structure of the resulting ceramic article, it is important that a temperature, which will give the desired physical characteristics, be chosen. If, for example, too low a firing temperature is used, a porous product is obtained. Since, in spark plug insulators, a porosity of a few hundredths of one per cent is objectionable in that it permits electrical leakage, it is essential in manufacturing such insulators that a sufficiently high temperature be used to give a nonporous product. Whenever firing a temperature above that necessary to produce a non-porous product is used, there will always be a certain amount of alumina from the crystalline phase which will go into solution in the glass phase. When these amounts are relatively small the result on physical structure is insignificant and serves as no detriment to the product. If, however, the firing temperature used is too high, these amounts of alumina which dissolve into the glass phase during firing will become sufficiently great to cause warping and other undesirable characteristics. The exact firing temperature used will depend, of course, on the specific constituents used in the raw batch and on their proportions. We have found that firing temperatures of between 2700° F. and 3200° F. are satisfactory to produce non-porous articles in which only minor and insignificant portions of alumina from the crystalline phase have gone into the glass phase. When making our preferred ceramic containing magnesia and strontia in combination in the glass phase from a raw batch containing about 90% alumina, 4.5% Florida kaolin, 5% Sierra talc and .5% strontium carbonate, we have found that a firing temperature of approximately 2900° F. is most suitable.

After firing, the structure will consist of alumina crystals bonded together by an alkaline earth aluminum silicate glass, the glass containing substantially the total amount of strontia added. If strontia is used in combination with another alkaline earth, then of course this second alkaline earth oxide will also be included in the glass phase.

The following examples illustrate specific embodiments of our invention in terms of their approximate percentage by weight compositions as determined by analysis after firing.

*Example I*

| Component | Percent |
|---|---|
| $Al_2O_3$ | 94.3 |
| $SiO_2$ | 3.7 |
| SrO | 1.8 |
| Metallic oxide impurities | .2 |

*Example II*

| Component | Percent |
|---|---|
| $Al_2O_3$ | 94.9 |
| $SiO_2$ | 2.7 |
| SrO | 1.1 |
| CaO | 1.0 |
| Metallic oxide impurities | .3 |

*Example III*

| Component | Percent |
|---|---|
| $Al_2O_3$ | 89.4 |
| $SiO_2$ | 6.2 |
| SrO | 1.9 |
| MgO | 2.1 |
| Metallic oxide impurities | .4 |

Compositions giving the above fired analysis and consisting of a glass phase bonded alumina have excellent resistance to lead salt corrosion in addition to other qualities which make them useful for insulators and other similar articles.

As was stated previously, in our preferred modification we use strontia in combination with magnesia so as to yield a strontium and magnesium aluminum silicate glass phase. Such a combination not only imparts a high resistance to lead salt corrosion but also gives the ceramic a high resistance to thermal shock. In this preferred modification which is manufactured from a raw batch including magnesium silicate (talc) or some other suitable magnesia yielding compound, the ratio of ingredients and in particular the magnesia:strontia ratio can of course be varied in accordance with the particular properties desired. We have found that compositions giving a fired analysis within the following range are particularly suitable as spark plug and other types of electrical insulators.

| Component: | Percent by weight |
|---|---|
| MgO | .4 to 3.3 |
| SrO | .15 to 2.2 |
| $SiO_2$ | 1.9 to 10.5 |
| $Al_2O_3$ | 85.5 to 97 |

The above table, of course, does not include the minor and insignificant portions of impurities which will normally be present in such compositions.

If desired, all of the alkaline earth may be strontia or the strontia may be in combination with an alkaline earth oxide other than magnesia. Thus, the alkaline earth oxide content may be from .55 to 5.5%, including at least .15% strontia.

The preferred embodiment of our magnesia-strontia containing ceramic, which is made from a raw batch containing 90% alumina, 5% Florida kaolin, 4.5% Sierra talc and a .5% strontium carbonate and fired at approximately 2900° F., gives the following analysis:

| Component: | Approximate Percent by weight |
|---|---|
| $Al_2O_3$ | 91.9 |
| $SiO_2$ | 5.7 |
| MgO | 1.6 |
| SrO | .4 |
| Metallic oxide impurities ($TiO_2$, $Fe_2O_3$, $K_2O$, $Na_2O$, CaO etc.) | .4 |

The non-porous sintered ceramic giving the above analysis and consisting of an aluminum oxide crystalline phase bonded by an alkaline earth aluminum silicate glass phase has a specific gravity of about 3.52, the thermal expansion being about $6.95 \times 10^{-6}$ °C. and the thermal conductivity about .032 cal./° C./cm./sec.

Insulators made from the ceramic have excellent mechanical strength, high insulating properties even at elevated temperatures and in addition have a high resistance to thermal shock and to the corrosive effects of lead compounds.

It is to be understood that while the invention has been described with specific reference to particular embodiments thereof, it is not to be so limited since changes therein may be made which are within the full intended scope of the invention as defined in the appended claims.

What we claim is:

1. A ceramic body having a dense non-porous sintered structure and consisting of a mass of corundum crystals bonded by a magnesium and strontium aluminum silicate glass said body giving a fired analysis of from about 85.5% to 97% by weight aluminum oxide, from about 1.9% to 10.5% by weight silicon dioxide, from about .15 to 2.2% by weight strontium oxide, and from about .4% to 3.3% by weight magnesium oxide.

2. A ceramic body having a dense non-porous sintered structure and consisting of a mass of corundum crystals bonded by a magnesium and strontium silicate glass said body giving a fired analysis of approximately 5.7% by weight silicon dioxide, approximately 1.6% by weight magnesium oxide, approximately .4% by weight strontium oxide and the balance aluminum oxide plus small amounts of metallic oxide impurities not to exceed .5% by weight.

3. A ceramic body having a dense non-porous sintered structure and consisting of a mass of corundum crystals bonded by an alkaline earth aluminum silicate glass containing magnesium oxide and strontium oxide, said body being made from a raw batch of approximately the following composition:

| | Percent by weight |
|---|---|
| Aluminum oxide | 90 |
| Sierra talc | 5 |
| Strontium carbonate | .5 |
| Florida kaolin | 4.5 |

4. The method of making a dense non-porous sintered body consisting of a mass of corundum crystals bonded by a magnesium and strontium aluminum silicate glass comprising the steps of pulverizing and mixing a raw batch having approximately the following composition by weight:

| | Percent |
|---|---|
| Aluminum oxide | 90 |
| Sierra talc | 5 |
| Florida kaolin | 4.5 |
| Strontium carbonate | .5 | shaping said raw batch into a body and firing said shaped body at between 2700° F. and 3200° F.

5. A ceramic body having a dense non-porous sintered structure and consisting of a mass of corundum crystals bonded by an alkaline earth aluminum silicate glass, said body giving a fired analysis of from about 85.5% to 97% by weight aluminum oxide, from about 1.9% to 10.5% by weight silicon dioxide, and from about .55% to 5.5% alkaline earth oxide including at least .15% strontium oxide.

6. A ceramic body having a dense non-porous sintered structure and consisting of a mass of corundum crystals bonded by an alkaline earth aluminum silicate glass, said body giving a fired analysis of from about 85.5% to 97% by weight aluminum oxide, from about 1.9% to 10.5% by weight silicon dioxide, from about .15% to 2.2% by weight strontium oxide, and from about .4% to 3.3% by weight alkaline earth oxide other than strontium oxide.

References Cited in the file of this patent
UNITED STATES PATENTS

| 1,438,598 | Jeffery | Dec. 12, 1922 |
| 1,966,408 | Hauman | July 10, 1934 |
| 2,120,338 | McDougal et al. | June 14, 1938 |
| 2,154,069 | Fessler et al. | Apr. 11, 1939 |
| 2,290,107 | Luks | July 14, 1942 |
| 2,308,115 | Schwartzwalder et al. | Jan. 12, 1943 |
| 2,419,290 | Schaefer | Apr. 22, 1947 |
| 2,436,708 | Bonnet et al. | Feb. 24, 1948 |
| 2,482,580 | Feichter | Sept. 20, 1949 |